(12) United States Patent
Ronchi (10) Patent No.: US 11,186,444 B2
(45) Date of Patent: Nov. 30, 2021

(54) APPARATUS FOR UNSCRAMBLING RANDOMLY ARRANGED CONTAINERS

(71) Applicant: RONCHI MARIO S.P.A., Gessate (IT)

(72) Inventor: Cesare Ronchi, Gessate (IT)

(73) Assignee: RONCHI MARIO S.P.A., Gessate (IT)

( * ) Notice: Subject to any disclaimer, the term of this patent is extended or adjusted under 35 U.S.C. 154(b) by 0 days.

(21) Appl. No.: 16/759,416

(22) PCT Filed: Oct. 25, 2018

(86) PCT No.: PCT/IB2018/058325
§ 371 (c)(1),
(2) Date: Apr. 27, 2020

(87) PCT Pub. No.: WO2019/082113
PCT Pub. Date: May 2, 2019

(65) Prior Publication Data
US 2020/0346878 A1 Nov. 5, 2020

(30) Foreign Application Priority Data

Oct. 27, 2017 (IT) .......................... 102017000122604
Oct. 27, 2017 (IT) .......................... 102017000122647

(51) Int. Cl.
*B65G 47/24* (2006.01)
*B65G 47/90* (2006.01)
(Continued)

(52) U.S. Cl.
CPC ............ *B65G 47/24* (2013.01); *B25J 9/0093* (2013.01); *B25J 9/0096* (2013.01); *B25J 9/1697* (2013.01);
(Continued)

(58) Field of Classification Search
CPC .. B65G 47/24; B65G 21/2072; B65G 47/901; B25J 9/1697; B25J 15/0033
(Continued)

(56) References Cited

U.S. PATENT DOCUMENTS

| 3,710,922 A | * | 1/1973 | Lanphere | ............. | B65G 47/256 |
| | | | | | 198/395 |
| 5,236,077 A | * | 8/1993 | Hoppmann | ........ | B65G 47/1471 |
| | | | | | 198/380 |

(Continued)

*Primary Examiner* — Douglas A Hess (57) ABSTRACT

An apparatus for unscrambling articles includes a transport system for transporting randomly-arranged articles on a transport plane and a system for extracting articles arranged with a predefined orientation and/or position. Devices for picking and releasing the articles are configured to pick up the articles randomly arranged on the transport system and release them to an extraction system with a predefined orientation and/or position. A detection system is designed to detect position and arrangement of the articles in transit and to provide information for controlling gripping and release devices, while a unit for processing and controlling components and drives of the apparatus is designed to receive the position and/or arrangement information of the articles and to control the gripping and release devices. The pick and release devices include a robot for picking up articles only from the first section, and a robot for picking up articles only from the second section.

20 Claims, 6 Drawing Sheets

(51) Int. Cl.
  *B25J 9/16* (2006.01)
  *B25J 15/00* (2006.01)
  *B65G 21/20* (2006.01)
  *B25J 9/00* (2006.01)
  *B65G 35/08* (2006.01)
  *B65G 47/30* (2006.01)
  *B65G 47/31* (2006.01)
  *B65G 54/02* (2006.01)
  *B65G 47/86* (2006.01)

(52) U.S. Cl.
  CPC ...... *B25J 15/0033* (2013.01); *B65G 21/2072* (2013.01); *B65G 35/08* (2013.01); *B65G 47/30* (2013.01); *B65G 47/31* (2013.01); *B65G 47/90* (2013.01); *B65G 47/901* (2013.01); *B65G 54/02* (2013.01); *B65G 47/847* (2013.01); *B65G 2201/02* (2013.01); *B65G 2201/0235* (2013.01); *B65G 2203/0225* (2013.01); *B65G 2203/0233* (2013.01); *B65G 2203/041* (2013.01); *B65G 2811/095* (2013.01)

(58) Field of Classification Search
  USPC .......... 198/376, 395, 398, 401, 407
  See application file for complete search history.

(56) References Cited

U.S. PATENT DOCUMENTS

| | | | | |
|---|---|---|---|---|
| 5,370,216 | A * | 12/1994 | Tsuruyama | G05B 19/4182 198/395 |
| 5,924,546 | A * | 7/1999 | Funaya | B65G 47/256 198/395 |
| 6,779,647 | B1 * | 8/2004 | Nagler | A22C 17/0093 198/395 |
| 7,591,364 | B2 * | 9/2009 | Monti | B65B 21/04 198/443 |
| 8,376,119 | B2 * | 2/2013 | Yohe | B29C 49/4273 198/395 |
| 8,880,216 | B2 * | 11/2014 | Izumi | G05B 19/4182 700/228 |
| 9,272,421 | B2 * | 3/2016 | Subotincic | B25J 15/0658 |
| 9,428,344 | B2 * | 8/2016 | Di Donna | B65B 57/04 |
| 9,433,994 | B2 * | 9/2016 | Matsuyama | B65H 11/002 |
| 9,434,548 | B2 * | 9/2016 | Brunee | B65G 35/08 |
| 10,087,017 | B2 * | 10/2018 | Klotz | B65G 47/256 |
| 10,773,901 | B2 * | 9/2020 | Laverdiere | B65G 47/843 |
| 10,792,706 | B2 * | 10/2020 | Wagner | G05B 19/4182 |
| 10,850,929 | B2 * | 12/2020 | Ronchi | B25J 9/0096 |
| 2009/0241472 | A1 * | 10/2009 | Lindee | |

* cited by examiner

APPARATUS FOR UNSCRAMBLING RANDOMLY ARRANGED CONTAINERS

CROSS-REFERENCE TO RELATED APPLICATIONS

The present application is a national stage entry of International Patent Application No. PCT/IB2018/058325, filed on Oct. 25, 2018, which claims priority to Italian Patent Application No. 102017000122647, filed on Oct. 27, 2017, and to Italian Patent Application No. 102017000122604, filed on Oct. 27, 2017.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates to an apparatus for unscrambling randomly arranged containers.

Brief Description of Related Art

It is known that, in the technical sector relating to the packaging of products, for example in liquid, fluid or powder form, there exists the need to handle articles, in particular containers, which have different capacities and forms and which are fed to operating machines such as automatic filling, capping and labelling machines designed to fill, close, label and subsequently forward the articles/products for packaging.

It is also known that these automatic machines must generally be fed continuously, at regular intervals and/or at a predefined constant speed, these parameters being set depending on the requirements of the said machines.

In addition, it may also be required that the containers should arrive at the automatic operating machines always in a certain—generally upright—position, i.e. with the filling opening directed upwards and/or with a specific orientation of its surfaces (conventionally identified as being front, side or rear relative to a longitudinal axis, the position of the filling mouth and/or the advancing direction through the machine), so as to allow correct handling of the article, for example necessary during labelling operations.

For this purpose, feeding apparatus—conventionally called "unscramblers"—have been developed, these apparatus being able to feed articles such as containers—which are initially arranged randomly inside hoppers—in an ordered sequence and with a predefined orientation and/or position (e.g. upright position) to said downstream operating machines.

Examples of these known machines are described in WO-2013/3024 A1 and EP 2 911 961. EP 2 911 961 describes an apparatus for unscrambling containers comprising a transport system with two belts which move in a same direction for transporting containers fed randomly, at least one robot for gripping and releasing the containers being arranged so as to pick up containers from a respective belt of the two belts and deposit them in a flat condition, with a predefined spacing and arranged with either one of two predefined orientations on a third transport belt, where a third robot is able to pick up the containers, rotate them and arrange them in an upright position on an extraction belt.

A further example of unscrambling machines according to the prior art is described in EP 2 235 740, which describes a plant for feeding products to a packaging machine comprising: a conveyor for advancing products, having a first transport section, a station for recovering products from the first transport section, and a second transport section, the said first and second transport sections being movable in straight directions, which are parallel to each other, and in a same advancing direction; and at least one recovery conveyor having a product inlet section communicating with said recovery section and a third transport section, extending parallel to said first and second transport sections and operated so as to be displaced in the opposite direction to the advancing direction of said first and second transport sections.

A plurality of robots are arranged downstream of the recovery station and are configured to:
- displace the products from the first transport section to the said second transport section; and
- displace from the said third transport section to the second transport section products which, not having been picked up from the first transport section, are fed by means of the recovery station to the third transport section.

In this plant configuration, a same robot is configured to pick up and displace both the products which advance in a first advancing direction on the first transport section and the products which advance in the opposite direction on the third transport section, where necessary giving priority to the latter. This is problematic both because the robots must be very fast in managing a large quantity of products randomly arranged on two different transport sections and therefore do not manage to achieve a satisfactory level of efficiency, and because the robots must be very complex and perform complicated movements in order to reach both transport sections and in particular re-orient the products, in the case of products which must be displaced with a predefined orientation, this making it even more difficult to achieve the desired unscrambling efficiency.

Therefore, the known unscrambling apparatus have overall a large number of drawbacks which limit their actual efficiency.

A first drawback arises from the fact that the known unscrambling machines are substantially unable to ensure a satisfactory level of efficiency, closer to 100%, for the pick, unscrambling and orderly release of the articles randomly fed to them, since the pick and release robots are unable to manage the large number of articles which pass within their range of action, resulting in fact a high percentage of fed articles which pass through the machine without being gripped and rearranged, these having to be then introduced again at the front of the unscrambling apparatus so as to pass through again.

This problem is exacerbated by the fact that the pick and release robots are configured to perform complicated handling operations for orienting and positioning the articles before they are released, said operations taking time and penalizing the efficiency of the unscrambling machine as well as resulting in the need to use complex and costly robots which may even require more than five degrees of freedom and/or axes of rotation.

Not even the addition of further pick, unscramble and release robots is able to improve substantially the final efficiency of the unscrambling machine, resulting instead in a significant increase in the cost and complexity of controlling the apparatus, which has a complex design, is highly prone to faults affecting the mechanical components which are subject to wear, and has considerable dimensions, with the result that overall the entire production line is not sufficiently productive.

For example, the unscrambling machine described in EP 2 911 961 has a declared efficiency of 33%, namely only about one article out of three fed to the apparatus is correctly picked, oriented and output for subsequent handling.

Likewise the management of the containers which, not having been picked by the robots, must be introduced again at the front of the transport system, is complex owing to the disadvantageous arrangement of the transport systems Furthermore it is required that the unscrambled articles should leave the unscrambling machine with a predefined pitch (distance between two successive articles); this is achieved:

- by means of complex operations performed by the pick and release robots (EP 2 911 961), which may result in a further reduction in the unscrambling efficiency of the robots which, in order to achieve the required technical effect, must have a more complex design, with time being lost in order to set the correct output pitch of the handled articles; or
- by inserting along the production line a queueing station for the containers which is formed, for example, by screw feeders which are able to form queues of containers without interruptions and at a predefined pitch for the downstream filling and capping machine. The queueing station must generally have a considerable length, which is often incompatible with the spaces available in the installation locations of the entire plant.

It is therefore clear from the above description that the plants and in particular the apparatus for unscrambling articles, such as containers, designed according to the prior art are substantially unable to ensure a satisfactory efficiency, which is closer to 100%, with regard to unscrambling of articles which are randomly fed to them.

SUMMARY OF THE INVENTION

The technical problem which is posed, therefore, is that of providing an apparatus for unscrambling articles, such as randomly fed containers, which is able to unscramble said articles so that they may be fed to inlet devices of downstream operating machines, such as filling, capping or labelling machines, providing a solution to or partially overcoming one or more of the aforementioned problems of the prior art.

A particular object of the present invention is to ensure an improved efficiency of unscrambling of the articles, which is closer to the optimum efficiency level of 100%.

A further desirable aspect is that the apparatus should have small dimensions, be easy and inexpensive to produce and assemble and be easily installed at any user location; in particular it is preferable that the apparatus should allow the use of pick and release robots which are simple and therefore faster, without negatively affecting the unscrambling efficiency. A further desirable aspect is that the apparatus should be able to unscramble asymmetrical products which must be fed to the downstream operating machines with a certain predefined position and/or orientation.

These results are obtained according to the present invention by an apparatus for unscrambling randomly arranged containers according to the features of Claim 1 and by a method for unscrambling articles according to the features of Claim 14. Such an apparatus (and method) are able to increase the efficiency of picking up and unscrambling articles, using robots for pick and releasing articles which are simple and therefore fast and reliable.

BRIEF DESCRIPTION OF THE SEVERAL VIEWS OF THE DRAWINGS

Further details may be obtained from the following description of non-limiting examples of embodiment of the subject of the present invention provided with reference to the case where the articles to be unscrambled are containers, such as bottles containing a product, and to the attached drawings, in which.

DETAILED DESCRIPTION OF THE INVENTION

Figure 1:
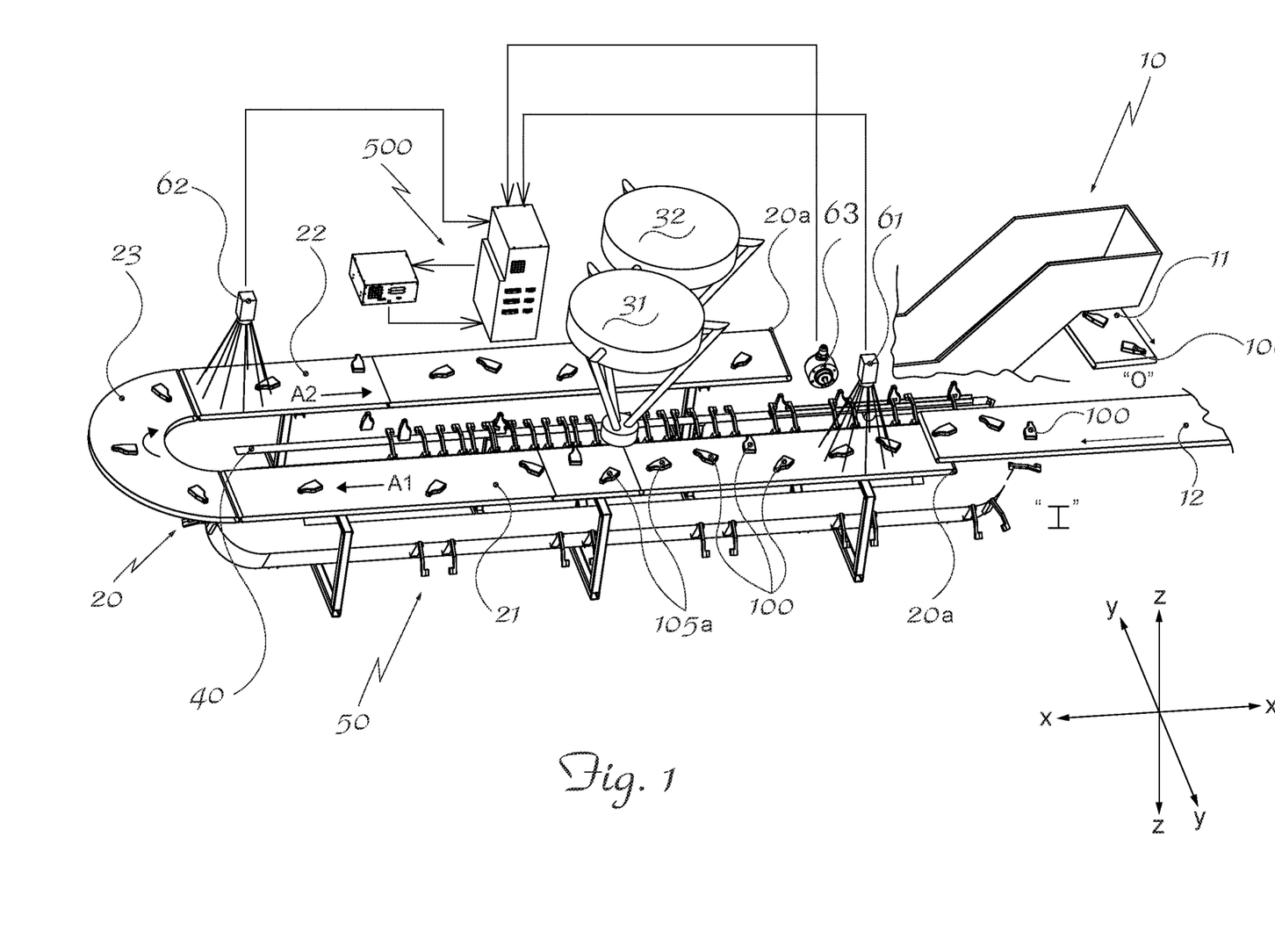
FIG. 1: shows a perspective view of a first example of embodiment of the unscrambling apparatus according to the present invention.

As shown in FIG. 1 and assuming solely for the sake of easier description and without a limiting meaning a set of three reference axes respectively along a longitudinal lengthwise direction X-X parallel to an advancing direction "A" of containers along the apparatus, transverse widthwise direction Y-Y of the apparatus perpendicular to said advancing direction, and vertical heightwise direction Z-Z of the apparatus perpendicular to the other two directions, as well as a part "I" for entry of the containers into the apparatus and a part "O" for exit of the containers therefrom, the unscrambling apparatus according to the invention substantially comprises:

a transport system for transporting through the apparatus containers randomly arranged on a transport plane.

In the example shown, the transport system comprises a conveyor belt 20 for supporting and transporting through the apparatus containers 100 randomly supplied by an external device 10. Said conveyor belt 20 extends advantageously substantially in the form of a "U" with a first outward section 21 and a second return section 22 connected by a curved connecting section 23, the first section 21 moving (FIG. 1) along a first advancing direction and sense A1 and the second section 22 moving along a different direction A2, in the example parallel to and in a sense substantially opposite to the advancing direction A1 of the first outward section 21;

devices 30 for picking and releasing the articles 100, which are arranged and configured to pick up the articles arranged randomly on the transport system and release them with a predefined orientation and/or position to an extraction device 50; according to the invention, the pick and release devices 30 comprise at least one robot 31 arranged at the first entry section 21 of the transport system, upstream of the curved section 23, and configured to remove articles only from said first section 21, and at least one robot 32 arranged at the second return section 22 of the transport system, downstream of the curved section 23, and configured to pick up the articles 100 only from said second section 22.

The robots 31,32 are therefore arranged at a suitable distance in the vertical direction Z-Z and transverse direction Y-Y from the respective belt of the first or second section 21,22 so that an operating area thereof comprises a respective portion of the respective first or second belt section 21;22.

the system for extracting the containers 100 from the apparatus is designed to receive the containers released by the devices 30 and extract them from the apparatus along an extraction direction, arranged (100') with a predefined orientation and/or position which is generally dictated by the requirements of the operating machines situated downstream of the unscrambling machine.

In the non-limiting example shown, the extraction system comprises:

a plane 40 for supporting the containers 100 being extracted, on which the containers may be deposited and transported, following release by the robots 31,32, with a predefined orientation and/or position;

means 50 for transporting the containers 100, designed to pick up the containers released by the robots 31,32 and transport them on the plane 40 in the extraction direction towards the outlet "O" of the apparatus;

a detection system 60 for detecting the position and the arrangement of the articles 100 in transit on the transport system and for providing the information for controlling the pick and release devices.

In the preferred example of embodiment shown, this system comprises at least a first camera 61 and a second camera 62, each arranged upstream of the associated robot 31,32 in the advancing direction A1,A2 and respectively able to detect the position and the arrangement of the containers 100 in transit on the transport plane within its field of vision, providing the information for controlling operation of the respective robot. Cameras of this type are known in the sector of unscrambling machines and are not described in greater detail.

The detection system 60 may preferably comprise also means 63 for measuring the advancing movement of one or more sections of the transport system, schematically shown here with an encoder 63 associated with the means for moving the belt 20.

Figure 2:
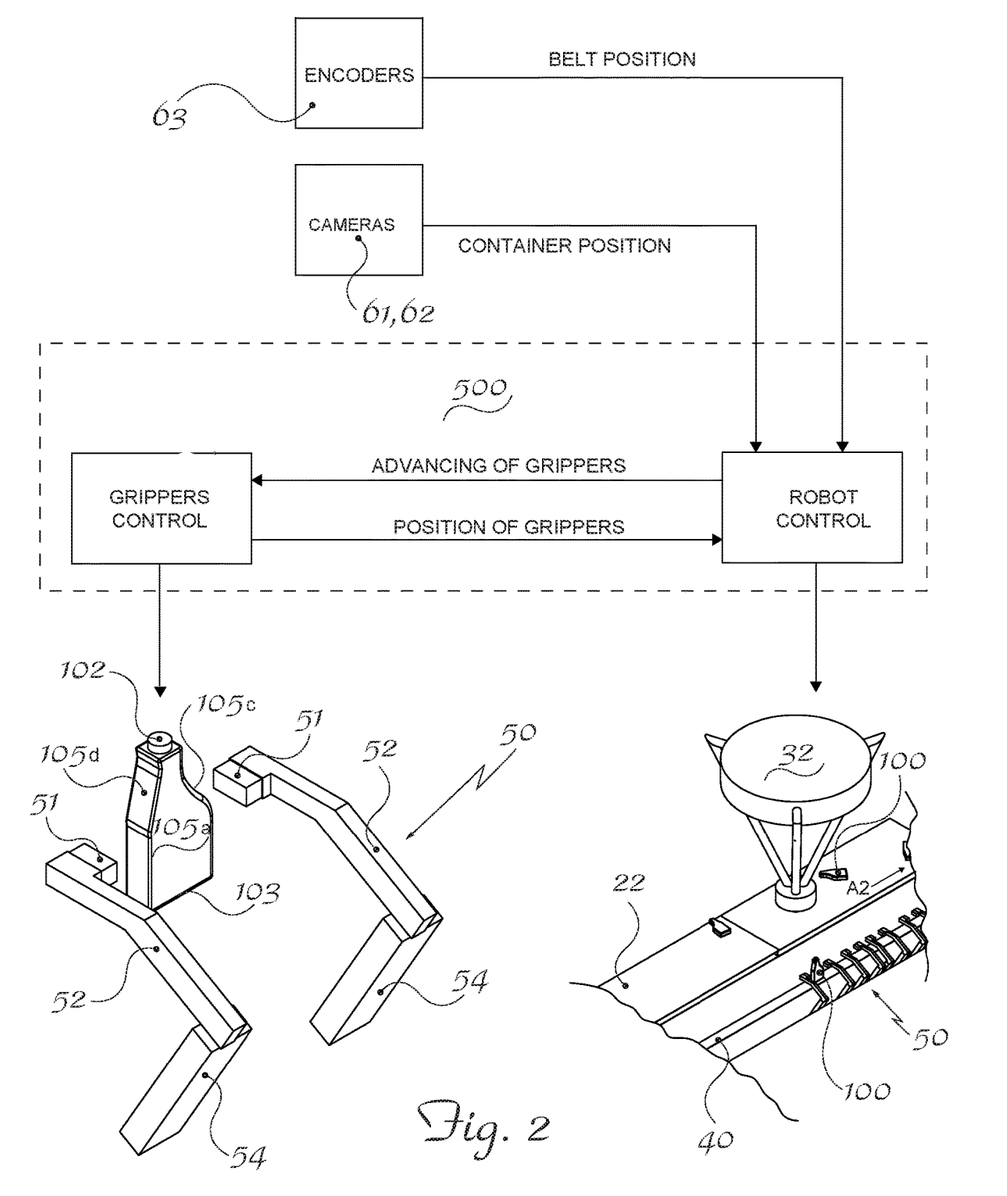
FIG. 2: shows a block diagram of the operating cycle for pick, orienting and delivering to auxiliary transport means the oriented containers.
Figure 3:
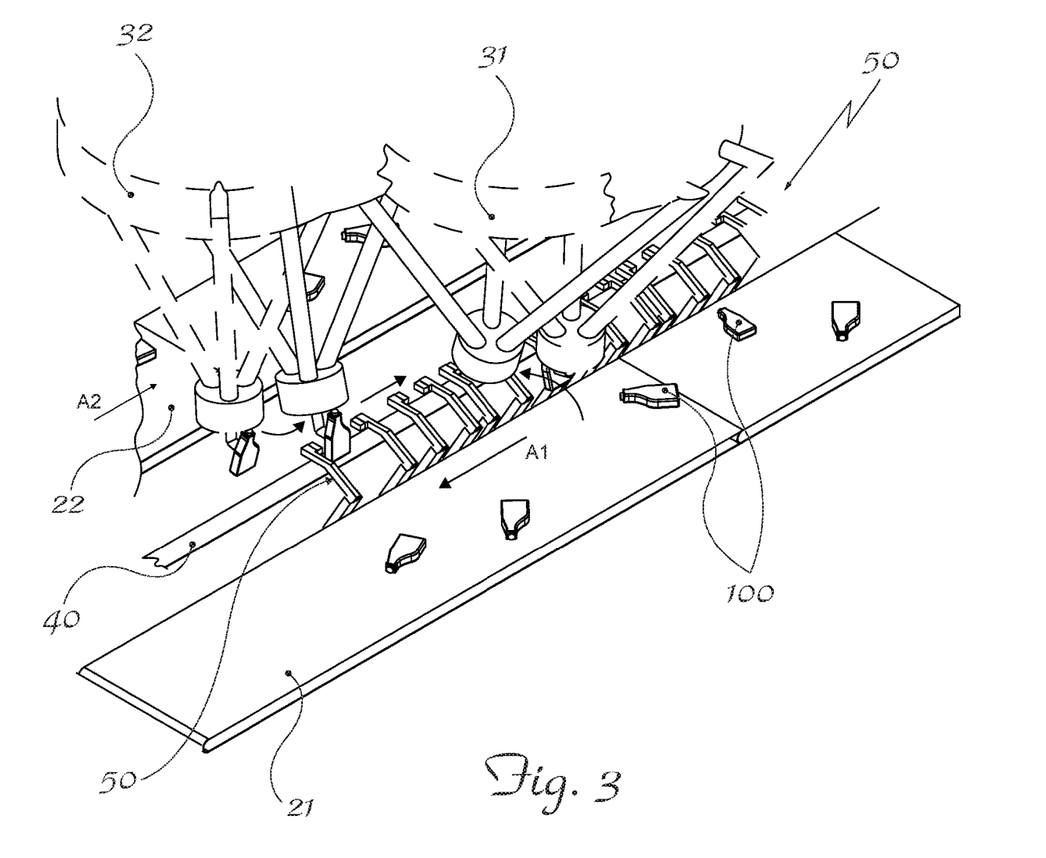
FIG. 3: shows a perspective view of the robots during release of the oriented container.

As schematically shown in FIG. 2, the apparatus may also comprise a unit 500 for processing and controlling the components and the drives of the apparatus, for example configured to receive the detection signals provided by the detection system 60 and consequently control the movement of the robots 31,32 for picking up the containers 100 from the transport system 20 and releasing them to the extraction system 40,50.

According to preferred embodiments, it is envisaged that the entry belt forms a closed loop on the rollers 20*a*, at least one of which is motor-driven by means of a gearmotor, so as to form an upper outward plane and a lower return plane.

It is also preferably envisaged that the U-shaped transport system may be formed by three independent belt portions (outward section 21, curved section 23 and return section 22), each of which can be operated independently of the other ones so as to determine different advancing speeds, giving rise to advantages in terms of efficiency, which will become clear below with reference to operation of the apparatus.

A particularly advantageous embodiment of the unscrambling apparatus of the invention is that where the extraction system comprises a plane 40 for supporting the containers released by the pick and release devices 30, which is arranged between the two sections of the U in a position equidistant from the first outward section 21 and from the second return section 22 of the transport system. This allows the configuration of a simplified system for management of the movements of the pick and release robots 31;32 associated with the respective first transport section 21 and second transport section 22, which robots therefore do not need to perform complicated and undesirable rotary translational movements with a long trajectory along multiple axes (in particular at least 3 axes), with a consequent simplification of the component parts and the processing and control system of the unscrambling machine, as well as greater efficiency of the robots 31,32 and in general of the pick-up, unscrambling and release cycle.

Preferably, the extraction direction is parallel to and in the same sense as that of the second section 22 of the transport system. Preferably, the extraction plane 40 is coplanar with the transport plane 20.

Figure 4:
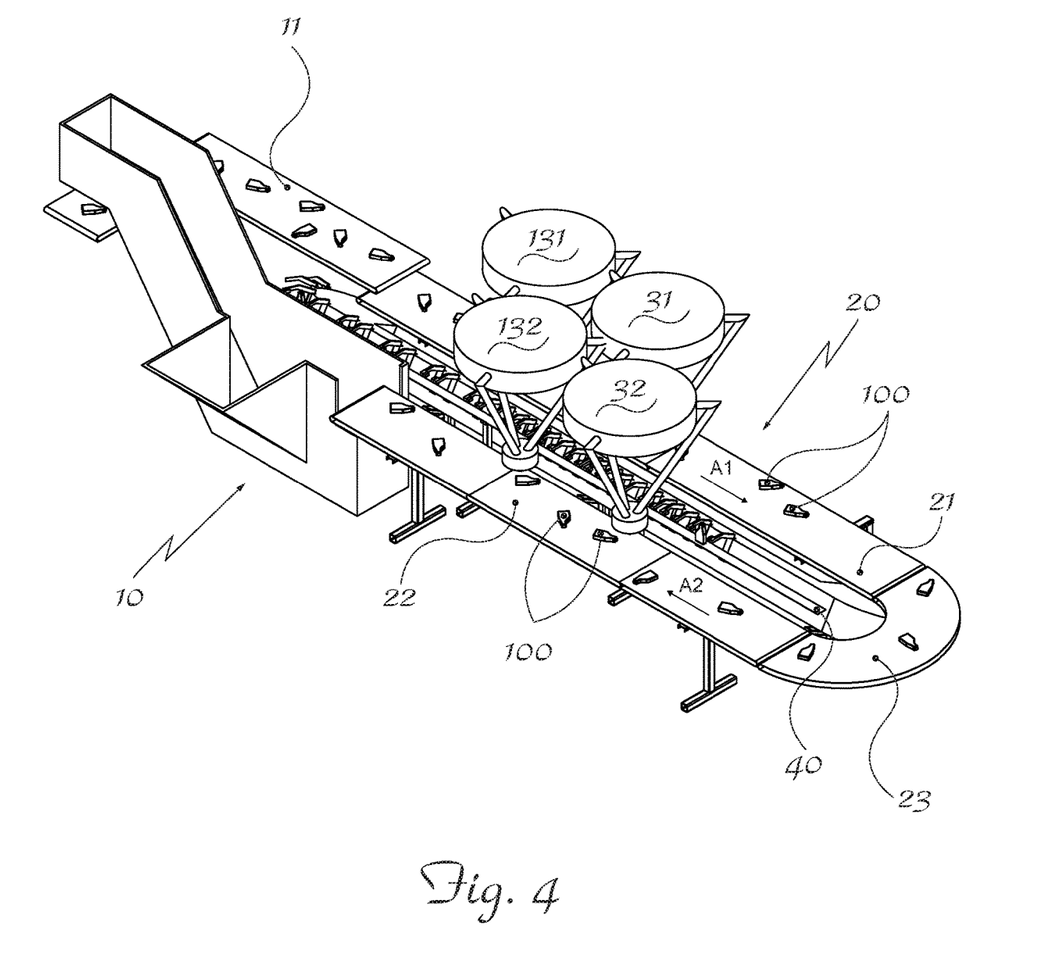
FIG. 4: shows a perspective view of a variation of an example of embodiment of the apparatus according to the invention.

The preferred embodiments shown in FIGS. 1 and 4 have a curved section of the U-shaped transport system which covers an angle of approximately 180°, with advancing directions of the first outward section 21 and the second outward section 22 which are parallel and in the opposite sense; this configuration is optimum since it allows limitation of the overall dimensions in the transverse direction Y-Y of the apparatus and further simplification of the movements of the robots 31,32, as well as arrangement of the extraction system so that the containers 100 oriented and/or positioned at the outlet of the apparatus advance, for example on the support plane 40, in a direction which is also parallel to the advancing directions A1,A2 of the first transport section 21 and the second transport section 22. The apparatus according to the invention is, however, not strictly limited in this sense, it being possible to arrange the transport system in the form of a "U" which is more open, for example with a curved section having an angle greater than 160°, and optionally arranging the extraction system so that the extraction/exit direction of the containers 100 extends along the line bisecting the angle of the curved section 23, in this way maintaining the symmetry of movement of the robots 31 associated with the first section 21 and the robots 32 associated with the second transport section 22.

Figure 5:
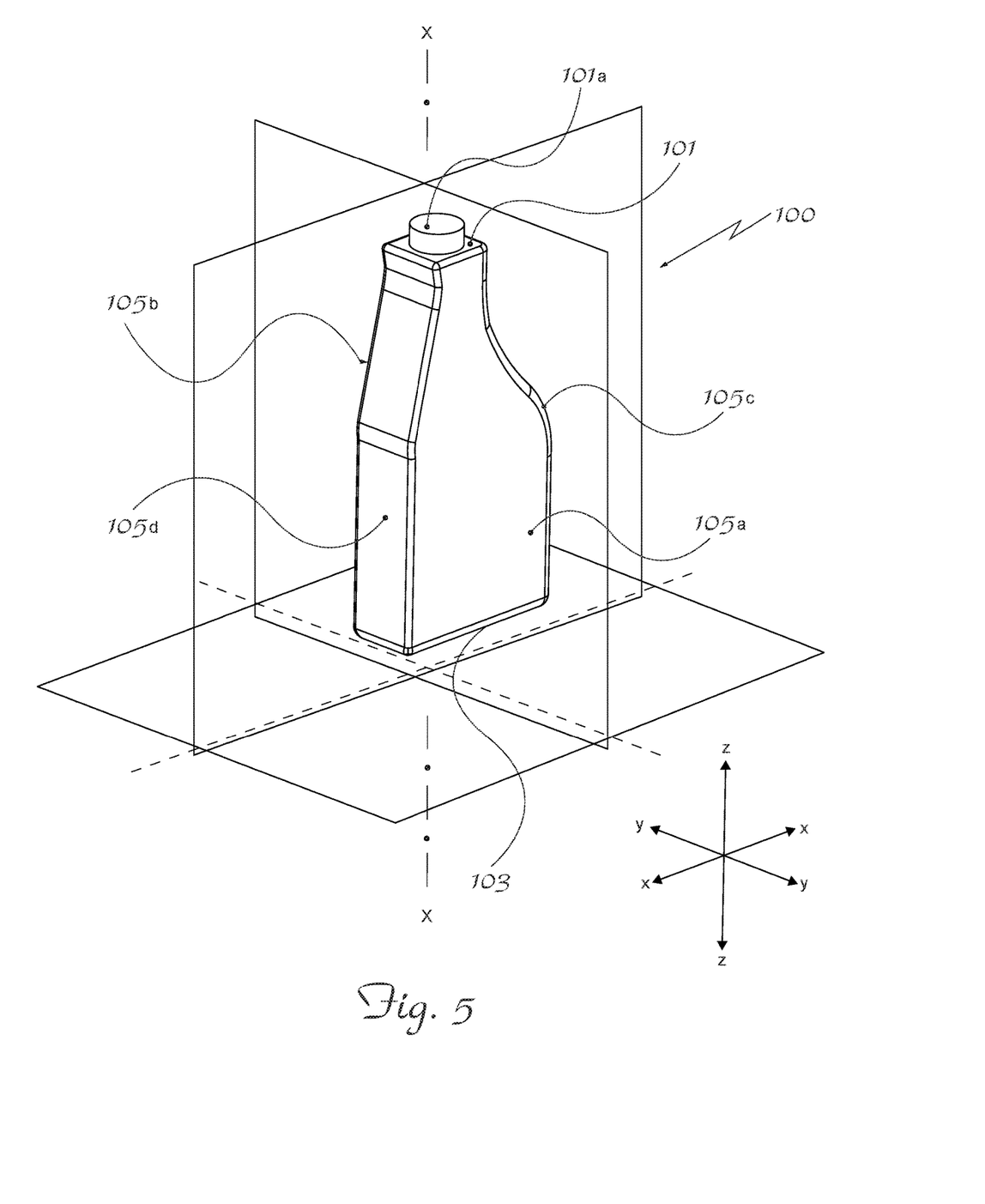
FIG. 5: shows a perspective view of an example of an asymmetrical container.

For the sake of easier description a container 100, defined as asymmetrical, since it is characterized by an irregular form such as that shown in FIG. 5, is described below.

The container has a form with a neck or mouth part 101—intended to receive a closing cap—arranged in an eccentric position with respect to the body 102 of the container.

Each container 100 is provided with a filling opening 101a which normally may have a circular form, with a main (or longitudinal) axis X-X, generally aligned with the greater dimension of the container, which may be perpendicular to said filling opening 101a and passing through the centre thereof, or axially offset with respect to the latter.

Each container 100 may have a bottom plane 103 which, in turn, may be perpendicular to said axis X-X and designed to support the container in the upright position.

The container also has a first side plane 105a and a second side plane 105b, situated opposite each other in the transverse direction Y-Y, as well as a front end plane or side 105c and a rear end plane or side 105d situated opposite to the front plane or side.

The front end surface 105c is generally that which, at the outlet of the apparatus, must be directed forwards, in the same sense as an advancing sense towards the outlet, for example towards downstream handling machines which may be designed to fill the container or apply a label to a predefined plane of the two side planes (for example the plane 105b) which, once the packaging has finished, must always bear the label and therefore must always be directed on the same side in the direction Y-Y transverse to the container. It will be evident to the person skilled in the art that the front side 105c may also not have a plane, but be in the form of a line joining together the two opposite side planes 105a, 105b.

For unscrambling of the articles, in particular in the case of asymmetrical articles such as the container 100 described by way of example, the apparatus may be advantageously configured so that the at least one robot 31 for picking up the articles from the first transport section 21 is set to pick up only articles arranged on the first transport section 21 with one or more predefined first orientations, and the at least one robot 32 for picking up the articles from the second transport section 22 is set to pick up only articles arranged on the second transport section 22 with one or more predefined second orientations different from said one or more first orientations. With reference to the example of the container 100 shown above, this may, for example, be realized by configuring the apparatus so that the pick-up robot 31 of the first section 21 is controlled so as to pick up the containers which, arranged randomly on the first transport section 21, have the first side face 105a exposed to view at the top and the robot 32 for the second section is controlled so as to pick up containers which have instead the second opposite side face 105b exposed to view at the top.

As shown in FIGS. 2 and 6-8, the transport means 50 for picking up the containers 100 and transporting them on the support plane 40 may preferably comprise a plurality of grippers 50, each comprising a pair of jaws 51. The grippers 50 are displaceable independently of each other.

Figure 6:
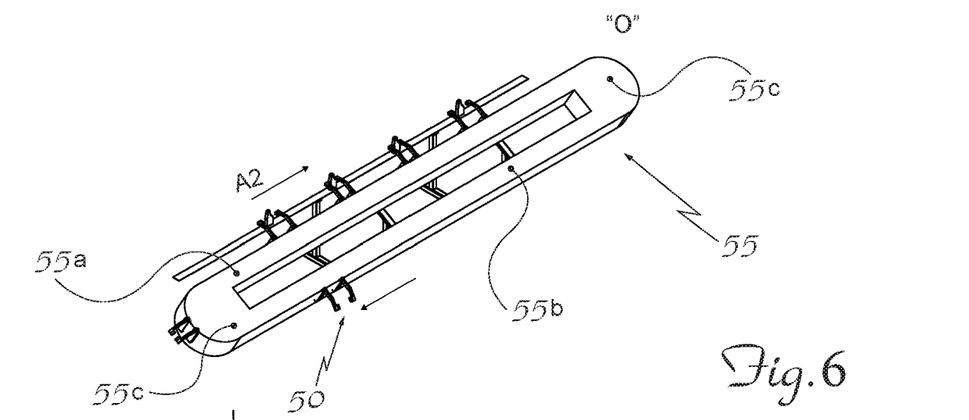
FIG. 6: shows a perspective view of an example of embodiment of the means for gripping and transporting the articles being extracted.

As shown, each jaw 51 is preferably mounted on a first end 52a of a respective arm 52, the other end of which is joined to a carriage 54 displaceable on a fixed guide 55.

The guide 55 has an extension which forms a closed-loop path with straight sections, i.e. an outward section 55a and return section 55b, which are connected by curved connecting sections 55c.

As shown, the guide 55 is arranged inclined with respect to the plane of the transport belt 20 and/or the extraction plane 40. This allows relative interference between the grippers 50 and one or both planes 20,40 to be avoided.

In particular, the guide 55 is preferably arranged so as to position:
the first straight section 55a in an upper position, preferably substantially coplanar with the extraction support plane 40, and
the opposite straight return section 55b in a lower position, preferably underneath the said plane of the conveyor belt 20.

Figure 7:
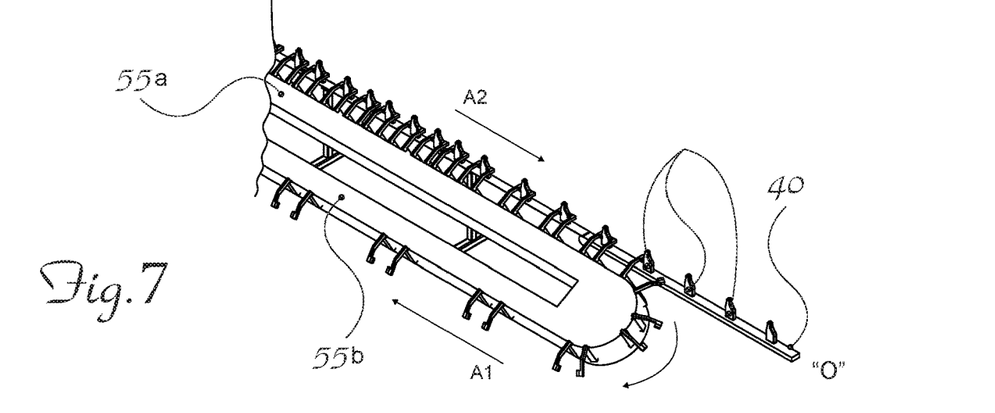
FIG. 7: shows a perspective view of an example of embodiment of the means for gripping and transporting the articles being extracted, during release and return of the pick means.

With this relative positioning and as shown in FIG. 7, it is possible to avoid relative interference between the two elements, allowing the grippers and in particular the single jaws to follow without obstacles the curved section 53 leading into the straight return section 55b which in turn does not interfere with the transport plane 20 for the containers.

A particularly preferred inclination of the fixed guide which is able to achieve these advantages is between 15° and 45°, and is preferably equal to about 30°. Preferably, the carriages 54 are movable independently of one another by means of drives controlled by the central unit 500 which is also preferably able to vary the advancing speed of the said carriages 54 along the different sections of the guide 55, for example under the control of the control unit 500.

According to a preferred embodiment, the driving system for the carriages comprises a linear motor comprising electric windings which are mounted on the fixed guide 55 and preferably extend over the whole length of the guide and permanent magnets arranged inside the single carriages 54. With this configuration, the magnets and therefore the carriages are moved and controlled in terms of position and speed by the magnetic field generated by the aforementioned fixed windings. Such operation allows the jaw-carrying carriages to be moved with speeds independent of each other and their advancing speed to be varied along the extension of the guides 55.

A further example of embodiment may have instead an electric motor on-board each carriage, an output shaft of which has a pinion designed to mesh with a linear rack mounted on the guide circuit 55.

With this configuration and as shown in FIGS. 1, 5, 6 the operating principle of the apparatus is as follows:
the containers 100 are fed randomly to the first section 21 of the input belt 20;
advancing in the first advancing direction in the sense A1 they cross the field of vision of the first camera 61, which detects the position of the container on said first belt 21 and its arrangement (orientation) on the transport plane of the first section 21—for example defined by the orientation of the front end face 105c and rear end face 105d and/or by the position of its side faces 105, 105b, respectively hidden since resting on the belt 120 and visible at the top;
the information relating to the position and arrangement of the container 100 on the transport plane 20 is sent to a central unit 500 which, if necessary correlating this information with the measurement information about the advancing of the belt, causes the activation of the first robot 31 which is authorized to pick up, for example, only the containers which have a certain first orientation on the plane of the first transport belt 21, said orientation being associated for example with the presence of the first side plane 105a which is visibly exposed, while allowing the other containers to pass by;

the first robot 31 picks up the selected containers and handles them in such a way as to position them in an upright position, with the filling neck and opening in the upper position and the front end face 105c correctly directed in the predefined direction for extraction towards the outlet;

continuing along the path defined by the conveyor belt 20, the containers 100 which are left travel around the curved section 23, reach the second section 21 of the "U" and, after reversal of the advancing direction A2, pass into the field of vision of the second camera 62 which detects the position and the orientation along the second section 22 of the "U";

most of the containers 100 detected on the second transport section 22 will now be formed by those containers, the orientation of which was different from (opposite to) the first orientation which can be managed by the first robot 31 and which were therefore ignored by the first robot 31 during their transit along the first section 21. These containers 100, however, have varied their advancing direction after passing around the curved section 23 and are therefore oriented in a range of arrangements which the second robot 32 is able to manage with a greater speed and precision;

the control unit 500 therefore authorizes the second robot 32 to pick up said containers 100 arranged with said second orientation;

the robot 32 picks up the containers 100 and handles them so as to bring them into an upright position with the filling neck 102 in the upper position and front end face 105c correctly directed in the same sense as the predefined extraction direction;

once the container has been picked and oriented, the container is released to the extraction system for picking up by the grippers 50 and preferably deposited on the output plane 40 on which it is transported by the gripping means 50 towards the outlet;

For example, at the same time or in any case in a manner coordinated with the release of the container 100 in an upright position by the robot 31, the two jaw-carrying carriages 54 of the gripping gripper 50 may arrive and, acting in synchronism controlled by the central unit 500, arrange the corresponding jaws 51 on opposite sides of the container 100 in the extraction direction and close the gripper 50 around the container 100, picking it up for transport towards the outlet "O".

At the outlet "O" the grippers may therefore release the container 100 which is correctly oriented, in an upright position and spaced with the correct pitch from adjacent containers 100. As schematically shown in FIG. 7, advantageously, the preferred inclined guide 55 with curved section 55c allows each jaw 55, which moving independently of the other jaw of the gripper 51 frees the container 100, to follow a path which lies in a plane inclined with respect to the support plane 40 for extraction of the container 100, therefore not interfering with the latter or with an adjacent container. The advantages arising from the particular U-shaped configuration of the transport belt 20 are many; with said configuration in fact the following may be obtained:

an entry zone "I" for the containers and a return zone "O" for them arranged on the same side as the entry zone "I"; consequently any containers which have not been picked up return automatically randomly to the feeding machine and from here enter again into circulation;

the U-shaped form comprising a first outward section and a second return section with reversal of the advancing direction A1, A2 allows the first robot to pick up containers only from the first section, and in particular all and only the containers oriented with a certain first orientation, leaving the second robot with the task of picking up the containers which the first robot did not manage to pick up or was unable to orient, and in particular all and only the containers oriented in the opposite direction, with the result that it is possible to reduce the degrees of freedom and the number of axes of the two robots which may in this way move always along a single sense in the transverse direction Y-Y so as to transfer the respective containers to the extraction system, the robots being no longer required to perform complicated rotary translation movements with a long trajectory on multiple axes (in particular at least 3 axes);

the U-shaped form of the transport belt and the configuration of the robots 30 enables a pick-up efficiency greater than 50% to be obtained since the robot 31 of the first branch 21 may pick up all and only the containers arranged with one or more first orientations on the first section, leaving the robot 32 of the second section 22 with the task of picking up all and only those which are left, reducing the number of containers which pass under the two robots without being picked up;

in a variation of embodiment it is also possible to envisage that the transport belt/system 20 is made with three segments—outward section 21, curved connecting section 23, return section 22, which are independent of each other and operated by controls and drives which are also independent, this giving rise to the further advantage: owing to the fact that robots 32 of the second section 22 must manage and if necessary pick up a small number of containers (on average 50%) compared to the number of containers which pass along the first section 21, it is possible to reduce the working speed of the robots and/or the speed of advancing movement to the advantage of the pick-up precision and therefore the final number of containers which are correctly handled;

in this configuration it is also possible to provide a third robot (not shown) associated with a corresponding camera and arranged above the curved connecting section 23 with the specific function of performing a pre-orientation of the containers which reach the return section 22 of the conveyor belt, thus favouring further the capacity and therefore the pick-up speed of the second robot and therefore overall of the entire apparatus. For example, this robot for the curved section 23 may be designed to re-orient the containers 100 which are arranged with said first orientation and which the robot 31 of the first section 21 was unable to pick up, so as to arrange them with said second orientation which may be managed by the robot 32 of the second section.

As shown in FIG. 1, it is envisaged that the means for separating the containers 100 may be arranged upstream of the transport belt, these means for example comprising an auxiliary belt section 120 which is operated independently of the first section, both during the advancing movement in a direction A1 the same as that of the outward section 21 and in the transverse direction Y-Y with an alternating movement for introducing a vibration which, when the containers fall on the belt 20, helps prevent several containers from being arranged on top of each other; this superimposed arrangement in fact makes it difficult or impossible to recognize the orientation of the containers which therefore cannot be picked up by the robots, reducing the efficiency of the machine which is instead increased by the action of the auxiliary belt 120.

As shown in FIG. 4 it is envisaged that the number of robots 31,32 may be increased by adding further robots 131,132—two in the example shown—associated with the first and/or second transport section. The further robots 131,132 of each section 21,22 may be controlled in a manner coordinated with the first respective robots 31,21 also without varying the detection system and using the same cameras 61,62. The addition of further robots 131,132 allows a further increase in the overall productivity of the apparatus, which may be closer to the optimum figure where 100% of the containers are correctly handled.

In addition to this it is advantageous to provide means for recovering the containers left on the transport system because they have not been correctly picked up by the robots 31,32, these devices being arranged at the outlet (O) of the return section 22 and configured to receive the containers and reintroduce them at the front of the transport system, for example supplying them to the feeding means 10. Said recovery and re-introduction operations are particularly facilitated owing to the U-shaped configuration with curved section of the transport system.

According to further preferred embodiments, the temporary support plane 40 for the oriented containers 100 deposited by the robots must be realized with a conveyor belt 140 which is operated by a corresponding actuator so as to perform a suitable movement sequence coordinated with the movement of the robots.

It is moreover clear to the person skilled in the art that release to the extraction system of the articles picked up by the robots may be performed by depositing them on the support plane in a manner coordinated with the arrival of the gripping means or by releasing them directly to the gripping means which transport them on the support plane towards the outlet.

It is also envisaged that, in the case of both the embodiments of the plane 40—belt 140—output transport system, vertical side shoulders 41 may be provided, these extending parallel to the advancing direction of the containers being extracted and being able to assist the bottles when they are being deposited, in order to reduce the possibility of said bottles falling/overturning when they are put down and/or during their advancing movement towards the outlet.

Figure 8:
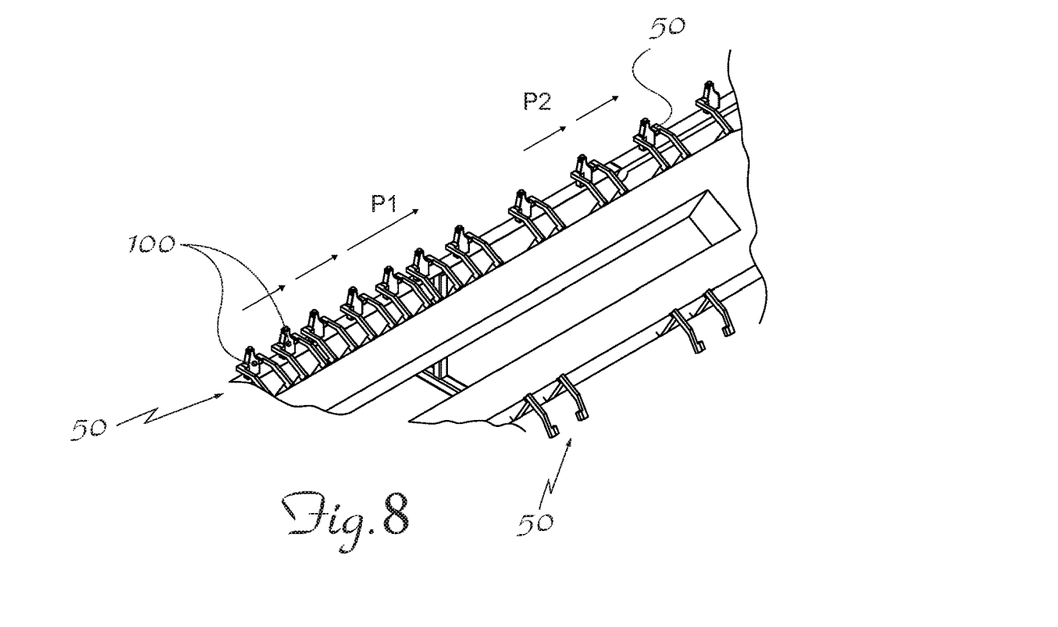
FIG. 8: shows a perspective view of an example of embodiment of the means for gripping and transporting the articles being extracted, during a change in the spacing pitch of the pick means.

The possibility of moving the grippers 50 independently of each other allows the following to be obtained:
- each carriage reaches the position for gripping the container 100 deposited by either one of the robots 31,32 in synchronism therewith, favouring gripping and reducing the risks of the container falling when it is released/deposited on the plane 40 and transferred to the gripper;
- a speed adapted to the gripping and release time of the robot 31, which time depends on the format of the container and its random position on the conveyor belt;
- an output speed compatible with the operating speed of the automatic downstream machine, independently of operation of the robots 31,32;
- variation of the pitch P1,P2 of the grippers as shown in FIG. 8, namely the distance present between one gripper and another gripper which is adjacent upstream or downstream in the advancing/extraction direction, this being advantageous both during gripping of the container released by the robot 30 and in particular during extraction towards downstream operating machines which must be fed with a specific pitch between successive articles, which varies from machine to machine. The apparatus is therefore easily adaptable also to production lines with pre-existing downstream operating machines.

In addition to all the advantages illustrated above the preferred configuration in which the single jaws 51 may be moved independently of each other and with different speeds, owing to the possibility of operating independently the jaw-carrying carriages 54 of the grippers 50, gives rise to further advantages:
- each carriage may determine different activation of closing of the gripper depending on the different types of container, for example closing symmetrically the jaws, or keeping the upstream jaws immobile and closing only the downstream jaw in the advancing direction; therefore all the problems and downtime associated with the format changes are eliminated;
- it is possible to release the container to downstream extraction systems, releasing each jaw 51 of a gripper 50 individually without relative interference, and preferably along a trajectory which lies in a plane (parallel to the plane of the inclined guide 55) which is inclined with respect to the plane 40 supporting the container;
- it is possible to increase significantly the speed along the return section 55b of the guide in order to create a flywheel of grippers ready for gripping. Owing to the U-shaped configuration of the transport system with associated pick and release devices it is also possible to ensure a smaller longitudinal extension of the machine, in particular owing to the transport sections and the extraction plane which are shorter (substantially half the length of a linear configuration), while also keeping as small as possible the span of the pick and release devices and, if present, reducing the number of extraction grippers.

Although described in connection with a number of embodiments and a number of preferred examples of implementation of the invention, it is understood that the scope of protection of the present patent is determined solely by the claims below.

The invention claimed is:

1. An apparatus for unscrambling articles, in particular containers (100) fed randomly to an inlet of said apparatus, comprising:
   - a transport system (20) for transporting the articles fed to the inlet, designed to transport through the apparatus articles arranged randomly on a transport plane;
   - an extraction system (40;140,50) for extracting the articles (100) arranged with a predefined orientation and/or position;
   - pick and release devices (31;32) for picking and releasing the articles (100), configured to pick up the articles arranged randomly on the transport system (20) and release them to the extraction system (50) with a predefined orientation and/or position;
   - a detection system (60) for detecting the position and the arrangement of the articles (100) in transit on the transport system and for providing the information for controlling the pick and release devices (30);
   - a unit (500) for processing and controlling the components and the drives of the apparatus, designed in particular to receive the information about the position and/or arrangement of the articles and to control the pick and release devices (30);

wherein:

said transport system (20) extends substantially in the form of a "U" with a first outward section (21) configured to transport the containers in a first advancing direction (A1) and a second return section (22) configured to transport the containers in a second advancing direction (A2) different from the first direction (A1), the two sections (21;22) being connected by a curved section (23); and wherein:

the pick and release devices (31;32) comprise at least one robot (31) arranged upstream of the curved section (23), at the first section (21) of the transport system, configured to pick up articles only from the first section (21) of the transport system, and at least one robot (32) arranged downstream of the curved section, at the second section (22), and configured to pick up articles (100) only from the second section (22) of the transport system (20).

2. The apparatus according to claim 1, wherein the advancing direction (A2) of the second return section (22) is parallel to and in a substantially opposite sense to the advancing direction (A1) of the first outward section (21).

3. The apparatus according to claim 1, wherein the apparatus is configured such that the at least one pick and release robot (31) for the first section (21) of the transport system is configured to pick up only articles arranged with one or more predefined orientations on said first section, and that the at least one pick and release robot (32) for the second section (22) of the transport system is configured to pick up only articles arranged with one or more predefined second orientations, different from the one or more first orientations, on said second transport section.

4. The apparatus according to claim 3, wherein the one or more first orientations include an orientation where the article is arranged on the transport system (20) with a first side face (105*a*) exposed to the detection system (60), and the one or more second orientations include an orientation where the article is arranged on the transport plane with a second side face (105*b*) opposite to the first side face (105*a*), exposed to the detection system.

5. The apparatus according to claim 1, wherein the extraction system comprises a support plane (40) for extracting the articles released by the pick and release devices (30), which is arranged equidistant from the first outward section (21) and from the second return section (22) of the transport system, preferably arranged along the line bisecting an angle formed by the curved section (23) for connecting together the outward section and the return section of the transport system.

6. The apparatus according to claim 1, wherein the extraction system comprises:

a plane (40;140) for supporting the articles (100) being extracted;

means (50) for extracting the articles (100) being extracted, designed to pick up the articles (100) released by the pick and release devices (30) and transport them on the plane (40) towards the outlet ("O") of the apparatus.

7. The apparatus according to claim 5, wherein said plane (40;140) for supporting the articles (100) being extracted comprises vertical side shoulders (141) extending parallel to the advancing direction (A1,A2); and/or in that said plane (40) is immobile or is a conveyor belt operated by an associated actuator so as to perform a suitable movement sequence synchronized with the movement of the pick and release robots (31,32) and/or gripping means (50) of the extraction system.

8. The apparatus according to claim 1, wherein the direction of extraction along the support plane (40) of the extraction system is parallel to and in the same direction as the advancing direction (A2) of the second transport section (22).

9. The apparatus according to claim 1, wherein the detection system comprises at least a first camera (61) and a second camera (62) each arranged upstream of the associated at least one robot (31,32) and designed to detect the position and the arrangement of one or more articles (100) in transit on the transport system underneath its field of vision, providing the information for controlling the respective at least one robot.

10. The apparatus according to claim 1, wherein the first section (21) and the second return section (22) of the transport system (20) are configured to be operated independently and/or with different advancing speeds.

11. The apparatus according to claim 10, wherein the curved connecting section (23) is configured to be operated independently and/or with an advancing speed different from that of the first section (21) and/or the second section (22) of the transport system.

12. The apparatus according to claim 1, further comprising at least one pick-up and handling robot arranged and configured to operate on articles (100) in transit on the curved connecting section (23).

13. The apparatus according to claim 1, wherein the extraction system comprises means for extracting the articles, comprising a plurality of grippers (5), each comprising a pair of jaws (51), wherein each gripper (50) is displaceable on a fixed guide (55) independently of one or more of the other grippers (50); and wherein optionally each jaw (51) of a gripper is mounted on a carriage (54) which is displaceable on the fixed guide (55) independently of the carriage (54) on which the other jaw (51) of the gripper is mounted.

14. A method for unscrambling articles, in particular randomly fed containers (100), comprising the steps of:

feeding randomly fed articles to a transport system (20), with transportation of the articles arranged randomly on a transport plane;

detecting the position and arrangement of the articles (100) in transit on the transport system and emitting corresponding position and arrangement information;

based on the position and arrangement information emitted: picking up the articles arranged randomly on the transport system (20) and releasing them to an extraction system with a predefined orientation and/or position by means of devices (31;32) for picking and releasing the articles (100);

extracting the articles (100) arranged with a predefined orientation and/or position by means of the extraction system (40;140, 50);

wherein the transportation of the articles (100) by the transport system (20) comprises the transportation along a path extending substantially in the form of a "U" with a first outward section (21), on which the containers are transported in a first advancing direction (A1), and a second return section (22), on which the containers are transported in a second advancing direction (A2) different from the first direction (A1), and a curved section (23) which connects the first and second sections (21,22);

and wherein the pick and release step is performed by at least one robot (31) which is arranged at the first transport section and which picks up only articles from said first section (21) upstream of the curved section, and by at least one robot (32) which is arranged at the second section (22) of the transport system (20) and which picks up only and exclusively articles which are arranged on the second section (22) of the transport system, downstream of the curved section (23), and which have not been picked up by the at least one robot for picking up articles from the first section (21) of the transport system.

15. The method for unscrambling articles according to claim 14, wherein the advancing direction (A2) of the second return section (22) is substantially opposite and parallel to the advancing direction (A1) of the first outward section (21).

16. The method for unscrambling articles according to claim 14, wherein the first section (21), the second return section (22) and/or the curved section (23) of the transport system (20) are operated independently and/or with different advancing speeds.

17. The method for unscrambling articles according to claim 14, wherein the release and/or extraction of the articles is performed opposite and/or along an extraction plane (40) equidistant from the first outward section (21) and from the second return section (22) of the transport system, preferably arranged along the line bisecting an angle formed by the curved section (23).

18. The method according to claim 14, wherein the at least one pick-up robot (31) for the first section (21) of the transport system picks up only articles arranged with one or more predefined orientations on said first section and the at least one pick-up robot (32) for the second section (22) of the transport system picks up only articles arranged with one or more second predefined orientations, different from the one or more first orientations, on said second section of the transport system.

19. The method according to claim 14, further comprising a step of varying the position and/or arrangement of one or more articles in transit along the curved section (23) of the transport system by means of at least one pick and handling robot arranged and configured to operate on articles (100) in transit on the curved connecting section (23).

20. The method according to claim 14, wherein the pick and release robots (31,32) release respective articles (100) to a respective plurality of grippers (50), each comprising a pair of jaws (51), wherein each gripper (50) is displaced on a fixed guide (55) independently one of one more of the other grippers (50) in a manner coordinated with the movement and the releasing action of the gripping and release robots (31,32).

* * * * *